(12) United States Patent
Yokoyama

(10) Patent No.: US 10,919,340 B2
(45) Date of Patent: *Feb. 16, 2021

(54) CAP TREAD RUBBER COMPOSITION FOR COLD WEATHER TIRES

(71) Applicant: SUMITOMO RUBBER INDUSTRIES, LTD., Kobe (JP)

(72) Inventor: Yuka Yokoyama, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 316 days.

This patent is subject to a terminal disclaimer.

(21) Appl. No.: 15/922,404

(22) Filed: Mar. 15, 2018

(65) Prior Publication Data

US 2018/0297406 A1    Oct. 18, 2018

(30) Foreign Application Priority Data

Apr. 13, 2017   (JP) ................. 2017-079803

(51) Int. Cl.
*B60C 1/00* (2006.01)
*C08L 9/00* (2006.01)

(52) U.S. Cl.
CPC .............. *B60C 1/0016* (2013.01); *B60C 1/00* (2013.01); *C08L 9/00* (2013.01); *B60C 2200/04* (2013.01)

(58) Field of Classification Search
CPC .................................................. B60C 1/0016
See application file for complete search history.

(56) References Cited

U.S. PATENT DOCUMENTS

| | | | | |
|---|---|---|---|---|
| 4,635,693 A * | 1/1987 | Ahagon | ................ | B60C 1/0016 152/209.5 |
| 5,447,971 A * | 9/1995 | Bergh | ..................... | C08K 3/36 152/905 |
| 5,788,786 A | 8/1998 | Yamauchi et al. | | |
| 6,114,432 A | 9/2000 | Takagishi et al. | | |
| 6,313,213 B1 | 11/2001 | Nakamura et al. | | |
| 6,355,728 B1 | 3/2002 | Kawazura et al. | | |
| 6,472,461 B1 | 10/2002 | Nakamura et al. | | |
| 8,813,802 B1 | 8/2014 | Lambert et al. | | |
| 10,493,801 B2 * | 12/2019 | Yokoyama | ................ | C08L 9/00 |
| 2007/0185253 A1 * | 8/2007 | Suzuki | ................. | B60C 1/0016 524/502 |
| 2008/0110544 A1 | 5/2008 | Nakamura | | |
| 2009/0306267 A1 * | 12/2009 | York | .................... | C08K 5/0025 524/430 |
| 2010/0108239 A1 * | 5/2010 | Recker | ................. | B29B 7/7495 156/110.1 |
| 2010/0184908 A1 | 7/2010 | Kikuchi et al. | | |
| 2011/0166254 A1 | 7/2011 | Nishimura | | |
| 2011/0190416 A1 * | 8/2011 | Maesaka | ................ | C08K 3/30 523/155 |
| 2011/0230613 A1 | 9/2011 | Hiro | | |
| 2012/0225974 A1 | 9/2012 | Uno et al. | | |
| 2014/0221525 A1 * | 8/2014 | Kojima | ................. | C08K 3/013 523/156 |
| 2015/0247027 A1 * | 9/2015 | Kojima | ..................... | C08L 9/00 524/526 |
| 2015/0361252 A1 | 12/2015 | Mabuchi | | |
| 2016/0297947 A1 | 10/2016 | Sakaki et al. | | |
| 2017/0130036 A1 * | 5/2017 | Kushida | ................ | B60C 1/0016 |
| 2017/0174876 A1 | 6/2017 | Maejima | | |
| 2017/0218170 A1 | 8/2017 | Hatano et al. | | |
| 2018/0030250 A1 * | 2/2018 | Yokoyama | ................ | B60C 1/00 |
| 2018/0093530 A1 * | 4/2018 | Ono | ....................... | C08J 9/0095 |
| 2018/0093531 A1 * | 4/2018 | Yokoyama | ................ | C08L 9/00 |
| 2018/0236815 A1 * | 8/2018 | Yokoyama | .............. | C08C 19/22 |
| 2019/0176520 A1 * | 6/2019 | Takenaka | .............. | B60C 1/0016 |

FOREIGN PATENT DOCUMENTS

| | | | |
|---|---|---|---|
| JP | 62-27442 | A | 2/1987 |
| JP | 1-165635 | A | 6/1989 |
| JP | 10-237224 | A | 9/1998 |
| JP | 11-21381 | A | 1/1999 |
| JP | 11-29660 | A | 2/1999 |
| JP | 2001-287508 | A | 10/2001 |
| JP | 2007-211042 | A | 8/2007 |
| JP | 2008-50432 | A | 3/2008 |
| JP | 2010-185025 | A | 8/2010 |
| JP | 2011-16905 | A | 1/2011 |
| JP | 2015-129238 | A | 7/2015 |
| JP | 2015-166410 | A | 9/2015 |
| JP | 2015-232112 | A | 12/2015 |
| JP | 2016-3254 | A | 1/2016 |

(Continued)

OTHER PUBLICATIONS

Japanese Office Action for Japanese Application No. 2016-193694, dated Jul. 25, 2017, with English translation.

(Continued)

*Primary Examiner* — Liam J Heincer

(74) *Attorney, Agent, or Firm* — Birch, Stewart, Kolasch & Birch, LLP

(57) ABSTRACT

Provided are a cap tread rubber composition for cold weather tires providing a balanced improvement in fuel economy, abrasion resistance, chipping resistance, performance on ice and snow during high-speed running, and high-speed performance (handling stability, grip performance) on snow/ice-free cold roads, and a cold weather tire formed therefrom. The rubber composition contains: a rubber component including an isoprene-based rubber, BR, and SBR; silica; and a plasticizer, the isoprene-based rubber and the BR being present in a combined amount of 80% by mass or more, the BR being present in an amount of 30% by mass or more, the SBR being present in an amount of 0.3-10% by mass, each based on 100% by mass of the rubber component, the rubber composition containing, per 100 parts by mass of the rubber component, 120 parts by mass or more of the silica and 50 parts by mass or more of the plasticizer.

11 Claims, No Drawings

(56) References Cited

FOREIGN PATENT DOCUMENTS

| JP | 2016-6139 A | 1/2016 |
| JP | 2016-89118 A | 5/2016 |
| JP | 2016-108352 A | 6/2016 |
| WO | WO 2015/098419 A1 | 7/2015 |
| WO | WO 2015/152398 A1 | 10/2015 |

OTHER PUBLICATIONS

U.S. Office Action for U.S. Appl. No. 15/720,096, dated Mar. 8, 2018.
Zeon Corporation, "General-purpose Rubber—BR (Polybutadiene rubber)," retrieved from URL:http://www.zeon.co.jp/business/enterprise/rubber/rubber_br.html, retrieved on Mar. 20, 2018, pp. 1-2 with English translation (3 pages total).

\* cited by examiner

CAP TREAD RUBBER COMPOSITION FOR COLD WEATHER TIRES

TECHNICAL FIELD

The present invention relates to a cap tread rubber composition for cold weather tires, and a cold weather tire formed from the rubber composition. The term "cold weather tire" as used herein refers to any tire that is intended to be used at low temperatures and has good performance on ice or snow. Specifically, it conceptually includes any of the following tires: snow tires marked on sidewalls as M+S, M.S, or M&S, and tires for the winter season and/or cold weather sold as winter tires or studless winter tires.

BACKGROUND ART

Rubber components consisting only of natural rubber and polybutadiene rubber have been widely used in cap treads of cold weather tires (winter tires) to provide low-temperature properties. Methods for further improving performance on ice are disclosed, including incorporating silica and a specific polybutadiene rubber (see Patent Literature 1).

Moreover, due to the recent improvement of road conditions, more and more vehicles with cold weather tires are driven at high speeds. However, since conventional cold weather tires place an importance on performance on ice and snow achieved during running at relatively low speeds, they tend to show inferior handling stability and grip performance during high speed running.

Moreover, improved abrasion resistance is demanded from the standpoint of protection of resources. However, when a large amount of filler such as silica is incorporated into a rubber component with a relatively low hardness as used in cold weather tire compounds, resistance to normal abrasion is improved, but wear caused by rubber chipping is not improved in many cases. This tendency is particularly noticeable in tires which are foamed or have surface patterns with fine sipes in order to improve performance on ice.

Moreover, in the case of fine particle silica-containing formulations, which are considered promising in terms of properties such as abrasion resistance and fuel economy, it is difficult to control the distribution of fine particle silica between the polybutadiene rubber layer and the natural rubber layer and the dispersion thereof in the rubber layers. Thus, tires with such formulations tend to be greatly inferior to summer tires in high speed performance on snow- and ice-free roads and resistance to chip wear. In addition, with the improvement of vehicle performance, many people drive at relatively high speeds even on icy roads. Thus, performance on ice during high speed running also needs to be improved.

Therefore, a need exists for techniques to improve high speed performance (handling stability, grip performance) on snow- and ice-free cold roads, abrasion resistance, and chipping resistance while enhancing performance on ice and snow during high speed running, thereby achieving a balanced improvement in properties including fuel economy, abrasion resistance, chipping resistance, performance on ice and snow during high speed running, and high speed performance (handling stability, grip performance) on snow- and ice-free cold roads.

CITATION LIST

Patent Literature

Patent Literature 1: JP 2015-232112 A

SUMMARY OF INVENTION

Technical Problem

The present invention aims to solve the problems and provide a cap tread rubber composition for cold weather tires providing a balanced improvement in fuel economy, abrasion resistance, chipping resistance, performance on ice and snow during high speed running, and high speed performance (handling stability, grip performance) on snow- and ice-free cold roads, and a cold weather tire formed from the rubber composition.

Solution to Problem

The present invention relates to a cap tread rubber composition for cold weather tires, containing: a rubber component including an isoprene-based rubber, polybutadiene rubber, and styrene-butadiene rubber; silica; and a plasticizer, the isoprene-based rubber and the polybutadiene rubber being present in a combined amount of 80% by mass or more, the polybutadiene rubber being present in an amount of 30% by mass or more, the styrene-butadiene rubber being present in an amount of 0.3% to 10% by mass, each based on 100% by mass of the rubber component, the rubber composition containing, per 100 parts by mass of the rubber component, at least 120 parts by mass of the silica and at least 50 parts by mass of the plasticizer.

Preferably, the isoprene-based rubber and the polybutadiene rubber are present in a combined amount of 90% by mass or more, and the styrene-butadiene rubber is present in an amount of 0.3% to 5% by mass, each based on 100% by mass of the rubber component.

The silica preferably has a nitrogen adsorption specific surface area of 180 m$^2$/g or more.

The polybutadiene rubber preferably has a cis content of 70% by mass or more.

The plasticizer is preferably at least one of a liquid plasticizer or a solid plasticizer.

The liquid plasticizer is preferably at least one selected from the group consisting of ester plasticizers, terpene resins, C5 resins, C5/C9 resins, styrene resins, coumarone-indene resins, and liquid diene polymers.

The solid plasticizer preferably has a softening point of 25 to 100° C.

Another aspect of the present invention relates to a cold weather tire, including a cap tread formed from the rubber composition.

Advantageous Effects of Invention

The cap tread rubber composition for cold weather tires of the present invention contains: a rubber component including an isoprene-based rubber, polybutadiene rubber, and styrene-butadiene rubber; silica; and a plasticizer, wherein the isoprene-based rubber and the polybutadiene rubber are present in a combined amount of 80% by mass or more, the polybutadiene rubber is present in an amount of 30% by mass or more, and the styrene-butadiene rubber is present in an amount of 0.3% to 10% by mass, each based on 100% by mass of the rubber component; and the rubber composition contains, per 100 parts by mass of the rubber component, at least 120 parts by mass of the silica and at least 50 parts by mass of the plasticizer. Such a rubber composition provides a balanced improvement in fuel economy, abrasion resistance, chipping resistance, performance on ice and snow during high speed running, and high speed performance (handling stability, grip performance) on snow- and ice-free cold roads.

DESCRIPTION OF EMBODIMENTS

[Cap Tread Rubber Composition for Cold Weather Tires]

The cap tread rubber composition for cold weather tires of the present invention contains predetermined amounts of a rubber component that includes an isoprene-based rubber, polybutadiene rubber (BR), and styrene-butadiene rubber (SBR), silica, and a plasticizer.

As described above, in the case of silica-containing formulations, it is usually difficult to control the distribution of silica among layers of different rubbers such as BR and NR and the dispersion in the rubber layers. The present invention uses a formulation with a high silica content which incorporates a rubber component including predetermined amounts of an isoprene-based rubber and BR together with a small amount of SBR and further which incorporates a plasticizer. Such a formulation shows improved processability so that the morphology can be stabilized, despite the fact that it is a formulation containing an isoprene-based rubber and BR, the morphology of which is difficult to control. Thus, it is possible to achieve a uniform distribution of silica among the rubber layers and further to improve the dispersion of silica in the rubber layers, thereby improving performance on ice and snow during high speed running, high speed performance (handling stability, grip performance) on snow- and ice-free cold roads, and chipping resistance.

Thus, the present invention can improve performance on ice and snow during high speed running, high speed performance (handling stability, grip performance) on snow- and ice-free cold roads, and chipping resistance while obtaining good fuel economy and good abrasion resistance, thereby significantly improving the balance of these properties. In particular, by addition of a small amount of SBR to a specific formulation of the present invention containing predetermined amounts of an isoprene-based rubber, BR, silica, and a plasticizer, the present invention achieves the effect of significantly (synergistically) improving the balance of the properties as compared to cases where the SBR is added to other formulations.

The cap tread rubber composition contains an isoprene-based rubber.

Examples of the isoprene-based rubber include natural rubber (NR), polyisoprene rubber (IR), refined NR, modified NR, and modified IR. The NR and IR may be those commonly used in the tire industry; for example, the NR may be SIR20, RSS#3, or TSR20, and the IR may be IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These rubbers may be used alone, or two or more of these may be used in combination.

The amount of the isoprene-based rubber based on 100% by mass of the rubber component is preferably 20% by mass or more, more preferably 25% by mass or more. An amount of 20% by mass or more tends to provide good resistance to breaking. The amount is preferably 60% by mass or less, more preferably 50% by mass or less, still more preferably 45% by mass or less. An amount of not more than 60% by mass tends to lead to good low-temperature properties.

The cap tread rubber composition contains BR. Non-limiting examples of the BR include those known in the tire field, such as BR with high cis content (high cis BR) and BR containing syndiotactic polybutadiene crystals. High cis BR is suitable among these. The BR may be an unmodified BR or a modified BR. Examples of usable commercial products include those available from Ube Industries, Ltd., JSR Corporation, Asahi Kasei Corporation, and Zeon Corporation. These rubbers may be used alone, or two or more of these may be used in combination.

The amount of BR based on 100% by mass of the rubber component is 30% by mass or more. An amount of 30% by mass or more tends to provide good performance on ice and snow (low-temperature properties). The amount is preferably 35% by mass or more, more preferably 40% by mass or more. The upper limit of the amount of BR is preferably 80% by mass or less, more preferably 70% by mass or less. An amount of not more than 80% by mass tends to ensure high speed performance on snow- and ice-free cold roads.

The BR preferably has a cis content of 70% by mass or more, more preferably 90% by mass or more, still more preferably 95% by mass or more. The use of such high cis BR provides a balanced improvement in low-temperature properties and abrasion resistance. The amount of high cis BR based on 100% by mass of the total BR is preferably 50% by mass or more, more preferably 90% by mass or more, most preferably 100% by mass.

The cis content herein is determined by infrared absorption spectrum analysis or NMR analysis.

Any modified BR may be used, such as BR containing a modifying group interactive with silica. In particular, the modified BR is preferably one in which at least an alkoxysilane compound is bound to the active terminal of a polybutadiene polymer having a cis content of 70% by mass or more.

The modified BR can be produced by known methods. For example, it may be produced by a polymerization reaction of butadiene in the presence of a polymerization catalyst to produce a polybutadiene polymer, followed by modification (hereinafter, also referred to as "modification reaction") of the active terminal of the polybutadiene polymer with an alkoxysilane compound. The cis content can be adjusted to 70% by mass or more by carrying out polymerization in the presence of, for example, a polymerization catalyst as described in WO 03/046020, which is incorporated by reference herein in its entirety.

The alkoxysilane compound to be used for the modification of the active terminal of the polybutadiene polymer preferably has two or more reactive groups, including an alkoxysilyl group. The reactive groups other than alkoxysilyl groups may be any types of reactive groups, preferably functional groups such as epoxy, isocyanate, carbonyl, cyano, or amino groups. The alkoxysilane compound may be in the form of a partial condensate or a mixture of the alkoxysilane compound and the partial condensate.

Suitable examples of the alkoxysilane compound include 3-glycidoxypropyltrimethoxysilane, 3-glycidoxypropyltriethoxysilane, [3-(diethylamino)propyl]-trimethoxysilane, and [3-(diethylamino)propyl]-triethoxysilane, and partial condensates thereof.

The combined amount of the isoprene-based rubber and BR based on 100% by mass of the rubber component is 80% by mass or more. When the combined amount is 80% by mass or more, good low-temperature properties tend to be provided. The combined amount is preferably 85% by mass or more, more preferably 90% by mass or more. The combined amount is preferably 99.7% by mass or less, more preferably 99.0% by mass or less. When the combined amount is 99.7% by mass or less, high speed performance on snow- and ice-free cold roads tends to be ensured.

The cap tread rubber composition contains SBR. Any SBR may be used, and examples include solution polymerized SBR (S-SBR) and emulsion polymerized SBR (E-SBR). The SBR may be an unmodified SBR or a modified SBR. Examples of usable commercial products include those available from Sumitomo Chemical Co., Ltd, JSR Corporation, Asahi Kasei Corporation, and Zeon Corporation. These rubbers may be used alone, or two or more of these may be used in combination.

The amount of SBR based on 100% by mass of the rubber component is 0.3% by mass or more, preferably 0.5% by mass or more, more preferably 1% by mass or more, in order to improve handling stability during high speed running and chipping resistance while ensuring low-temperature properties. In view of performance on ice and snow, the amount of SBR is 10% by mass or less, preferably 9% by mass or less, more preferably 6% by mass or less, still more preferably 5% by mass or less. The incorporation of SBR in the range indicated above results in improved high speed running performance and improved chipping resistance.

The SBR preferably has a styrene content of 10% by mass or more, more preferably 15% by mass or more. When the styrene content is 10% by mass or more, the effects of the present invention tend to be sufficiently achieved. The styrene content is preferably 40% by mass or less, more preferably 35% by mass or less. When the styrene content is 40% by mass or less, good performance on ice and snow tends to be provided. Herein, the styrene content is determined by $^1$H-NMR analysis.

The SBR in the present invention may contain other copolymerized components in an amount that does not impair the properties of SBR (e.g., 3% by mass or less). Specific examples include compounds for introducing modifying groups and diene monomers other than butadiene.

The rubber component may include other rubbers as long as they do not inhibit the effects of the present invention. Examples of other rubbers include chloroprene rubber (CR), acrylonitrile butadiene rubber (NBR), ethylene-propylene-diene rubber (EPDM), butyl rubber (IIR), and halogenated butyl rubber (X-IIR). Each type of rubber such as NR may be a single material or a combination of two or more materials.

The cap tread rubber composition contains silica as filler.

The amount of silica per 100 parts by mass of the rubber component is 120 parts by mass or more. An amount of 120 parts by mass or more tends to provide excellent abrasion resistance and excellent wet performance. The lower limit of the amount of silica is preferably 125 parts by mass or more, more preferably 130 parts by mass or more, still more preferably 135 parts by mass or more. In view of processability and performance on ice, the upper limit of the amount is 250 parts by mass or less, more preferably 220 parts by mass or less.

Any silica may be used, including, for example, dry silica (anhydrous silicic acid) and wet silica (hydrous silicic acid). Wet silica is preferred as it contains a large number of silanol groups. One type of silica may be used alone, or two or more types may be used in combination. Examples of commercial products include Nipsil AQ ($N_2$SA: 200 m$^2$/g, CTAB specific surface area: 155 m$^2$/g) available from Tosoh Silica Corporation; Zeosil Premium 200MP ($N_2$SA: 200 m$^2$/g, CTAB specific surface area: 200 m$^2$/g) and HRS 1200MP ($N_2$SA: 200 m$^2$/g, CTAB specific surface area: 195 m$^2$/g) both available from Rhodia; and Ultrasil 9000GR ($N_2$SA: 240 m$^2$/g, CTAB specific surface area: 200 m$^2$/g) available from Evonik.

In order to significantly improve abrasion resistance and performance on ice and snow, the silica preferably has a nitrogen adsorption specific surface area ($N_2$SA) of 160 m$^2$/g or more, more preferably 180 m$^2$/g or more, still more preferably 190 m$^2$/g or more. In view of abrasion resistance, the $N_2$SA is particularly preferably 200 m$^2$/g or more. Although the upper limit of the $N_2$SA is not particularly critical, it is preferably 400 m$^2$/g or less, more preferably 300 m$^2$/g or less, in order to obtain good workability and good processability. The nitrogen adsorption specific surface area of the silica is determined by the BET method in accordance with ASTM D3037-81.

In view of abrasion resistance, performance on ice and snow, and chipping resistance, the silica preferably has a cetyltrimethylammonium bromide (CTAB) specific surface area of 150 m$^2$/g or more, more preferably 180 m$^2$/g or more, still more preferably 190 m$^2$/g or more. In view of workability and processability, the CTAB specific surface area is preferably 400 m$^2$/g or less, more preferably 300 m$^2$/g or less. The CTAB specific surface area is determined in accordance with ASTM D3765-92.

The amount of silica based on 100% by mass of the total filler is preferably 60% by mass or more. In this case, a balanced improvement in fuel economy, abrasion resistance, and grip performance can be achieved, and the effects of the present invention can be well achieved. The amount of silica is preferably 70% by mass or more, more preferably 80% by mass or more. The upper limit of the amount is not particularly critical, but is preferably 99% by mass or less, more preferably 98% by mass or less.

The cap tread rubber composition preferably contains a silane coupling agent together with silica. Examples of the silane coupling agent include sulfide silane coupling agents such as bis(3-triethoxysilylpropyl)disulfide and bis(3-triethoxysilylpropyl)tetrasulfide; mercapto silane coupling agents such as 3-mercaptopropyltrimethoxysilane and 3-octanoylthiopropyltriethoxysilane; vinyl silane coupling agents such as vinyltriethoxysilane; amino silane coupling agents such as 3-aminopropyltriethoxysilane; glycidoxy silane coupling agents such as γ-glycidoxypropyl-triethoxysilane; nitro silane coupling agents such as 3-nitropropyltrimethoxysilane; and chloro silane coupling agents such as 3-chloropropyltrimethoxysilane. Among these, sulfide silane coupling agents are preferred. The amount of the silane coupling agent per 100 parts by mass of silica is preferably 0.5 to 30 parts by mass, more preferably 1.5 to 15 parts by mass.

The silane coupling agent may be a product available from, for example, Evonik, Momentive Performance Materials Inc., Shin-Etsu Silicone, Tokyo Chemical Industry Co., Ltd., AZmax. Co., or Dow Corning Toray Co., Ltd.

The cap tread rubber composition preferably contains carbon black as filler. This improves antistatic properties and weatherability. Furthermore, a good balance of the above-mentioned properties can be achieved.

Non-limiting examples of the carbon black include N134, N110, N220, N234, N219, N339, N330, N326, N351, N550, and N762. Examples of commercial products include those available from, for example, Asahi Carbon Co., Ltd., Cabot Japan K.K., Tokai Carbon Co., Ltd., Mitsubishi Chemical Corporation, Lion Corporation, NSCC Carbon Co., Ltd, and Columbia Carbon.

The amount of carbon black per 100 parts by mass of the rubber component is preferably 0.1 parts by mass or more, more preferably 1.0 part by mass or more. An amount of 0.1 parts by mass or more tends to provide the aforementioned addition effects. The upper limit of the amount is not particularly critical, but is preferably 20 parts by mass or less, more preferably 10 parts by mass or less, still more preferably 5 parts by mass or less, in view of fuel economy.

The carbon black preferably has a nitrogen adsorption specific surface area ($N_2SA$) of 50 $m^2/g$ or more, more preferably 90 $m^2/g$ or more, still more preferably 100 $m^2/g$ or more, further preferably 110 $m^2/g$ or more, in order to provide good chipping resistance, abrasion resistance, and other properties. The $N_2SA$ is preferably 200 $m^2/g$ or less, more preferably 180 $m^2/g$ or less, for good dispersibility. The $N_2SA$ of the carbon black is determined in accordance with JIS K 6217-2:2001.

The cap tread rubber composition contains a plasticizer.

The term "plasticizer" refers to a material that imparts plasticity to a rubber component, and conceptually includes liquid plasticizers (plasticizers which are liquid (in liquid state) at 25° C.) and solid plasticizers (plasticizers which are solid at 25° C.). More specifically, the plasticizer is a component that can be extracted from a rubber composition using acetone.

The amount of the plasticizer (the combined amount of liquid and solid plasticizers) per 100 parts by mass of the rubber component is 50 parts by mass or more, preferably 55 parts by mass or more, more preferably 60 parts by mass or more, in order to improve processability and performance on ice and snow. Usually, the incorporation of a large amount of plasticizers often results in poor chipping resistance. However, the present invention was completed based on the finding that by further incorporating a certain amount of SBR, excellent chipping resistance can also be obtained while improving performance on ice and abrasion resistance. The upper limit of the amount of the plasticizer is not particularly critical, but in view of abrasion resistance and resistance to breaking it is preferably 200 parts by mass or less, more preferably 180 parts by mass or less, still more preferably 150 parts by mass or less, particularly preferably 120 parts by mass or less.

Examples of liquid plasticizers include process oils, extender oils, plant oils, animal oils, and other fats and oils, liquid polymers (e.g. diene-, olefin-, or ester-based liquid polymers), liquid resins, essential oils from natural products such as turpentine oil, and ester plasticizers. Examples of solid plasticizers include solid resins and waxes usually used in the tire industry which are solid (in solid state) at 25° C.

The liquid plasticizer is preferably an ester plasticizer (an ester group-containing compound), a liquid resin, or a liquid diene polymer. In this case, even when a large amount of silica is incorporated, processability and dispersibility can be improved to achieve a balanced improvement in performance on ice and snow and abrasion resistance.

Examples of the ester plasticizer (ester group-containing compound) include esters which are liquid at 25° C., such as fatty acid esters such as plant oils, phthalic acid esters, and phosphoric acid esters. They have moderate polarity and interact with silica to improve its dispersibility. Furthermore, they provide the rubber composition with flexibility at low temperatures. Thus, they, even when incorporated in a large amount, can improve performance on ice and snow and chipping resistance without reducing abrasion resistance.

Non-limiting examples of the liquid resin include resins which are liquid at 25° C., such as terpene resins (including terpene phenol resins and aromatic modified terpene resins), rosin resins, styrene resins, C5 resins, C5/C9 resins, coumarone-indene resins (including resins based only on coumarone or indene), olefin resins, polyurethane resins, and acrylic resins. Among these, terpene resins, C5 resins, C5/C9 resins, styrene resins, and coumarone-indene resins are particularly preferred. The incorporation of such a component provides a higher compatibility with the diene rubber matrices to reinforce the strength between the rubber matrices, and also improves processability to improve dispersibility of silica. Thus, chipping resistance as well as performance on ice and snow and abrasion resistance can be improved.

Non-limiting examples of the liquid diene polymer include diene polymers which are liquid at 25° C., such as liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), and liquid styrene-isoprene-styrene block copolymers (liquid SIS block polymers). These polymers may be modified at the terminal or the main chain with a polar group. Such a liquid diene polymer is well compatible with the rubber matrix and, further, co-cures therewith, thereby less likely to bleed, and it provides flexibility to the rubber component. Thus, abrasion resistance, performance on ice and snow, and chipping resistance can be significantly enhanced while improving processability.

The liquid diene polymer may suitably be an epoxidized diene polymer having a weight average molecular weight (Mw) of $1.0\times10^3$ to $2.0\times10^5$ (hereinafter, also referred to as low molecular weight epoxidized diene polymer). In view of properties such as abrasion resistance and processability, the Mw is preferably $2.0\times10^3$ to $1.0\times10^5$, more preferably $3.0\times10^3$ to $5.0\times10^4$.

The degree of epoxidation of the low molecular weight epoxidized diene polymer is not particularly limited, but is preferably 50% by mass or less, more preferably 30% by mass or less, still more preferably 20% by mass or less. A degree of epoxidation of 50% by mass or less tends to lead to good abrasion resistance. The degree of epoxidation of the low molecular weight epoxidized diene polymer is preferably 0.1% by mass or more, more preferably 1% by mass or more, still more preferably 5% by mass or more. A degree of epoxidation of 0.1% by mass or more tends to lead to good dispersion of silica.

In view of affinity for BR, the low molecular weight epoxidized diene polymer is preferably a polymer containing a butadiene unit, more preferably an epoxidized polybutadiene (hereinafter, also referred to as low molecular weight epoxidized polybutadiene (L-EBR)). The microstructure (e.g. cis content, trans content, vinyl content) of the L-EBR is not particularly limited, but the vinyl content is preferably 1% to 90% by mass, more preferably 2% to 80% by mass, still more preferably 2% to 50% by mass, in order to provide good rubber properties.

In the case where a liquid plasticizer is incorporated, in view of the effects of the present invention, the amount of the liquid plasticizer per 100 parts by mass of the rubber component is preferably 2 to 150 parts by mass, more preferably 5 to 120 parts by mass, still more preferably 10 to 100 parts by mass.

The solid plasticizer may be any solid resin or wax usually used as a compounding ingredient for tires. Specific examples include terpene resins, rosin resins, styrene resins, olefin resins, C5 resins, C9 resins, C5/C9 resins, coumarone resins, indene resins, coumarone-indene resins, acrylic resins, and urethane resins. These materials may be used alone, or two or more of these may be used in admixture. The resins themselves may be copolymerized with multiple monomer components. In view of compatibility with the rubber component and abrasion resistance, terpene resins, C5 resins, C5/C9 resins, styrene resins, and coumarone-indene resins are particularly preferred among these.

The solid plasticizer preferably has a softening point of 25° C. or higher, more preferably 30° C. or higher. The upper limit of the softening point is not particularly critical, but in view of processability it is preferably 150° C. or lower, more preferably 130° C. or lower, still more preferably 100° C. or lower, particularly preferably 90° C. or lower.

The softening point is determined as set forth in JIS K 6220-1:2001 with a ring and ball softening point measuring apparatus and is defined as the temperature at which the ball drops down.

In the case where a solid plasticizer is incorporated, in view of the effects of the present invention, the amount of the solid plasticizer per 100 parts by mass of the rubber component is preferably 2 to 150 parts by mass, more preferably 5 to 120 parts by mass, still more preferably 10 to 100 parts by mass.

The cap tread rubber composition preferably contains an organic fiber. Any organic fiber may be used including those known in the tire field. A suitable example is a composite (fiber) consisting of a hydrophilic resin whose surface is provided with a coating layer.

The hydrophilic resin may be a resin that can have affinity for water, namely, a resin having a hydrophilic group in the molecule. Examples include ethylene-vinyl alcohol copolymers, vinyl alcohol homopolymers, poly(meth)acrylate resins, polyamide resins, aliphatic polyamide resins, aromatic polyamide resins, polyester resins, polyolefin resins, polyvinyl alcohol resins, cellulosic resins, and acrylic resins.

The surface of the composite (fiber) of the hydrophilic resin has affinity for the rubber component. Preferably, the surface of the composite is provided with a coating layer formed of a low melting point resin having a melting point lower than the maximum vulcanization temperature (hereinafter, also referred to as "low melting point resin"). In this case, the composite (fiber) shows good affinity for the neighboring rubber component while effectively maintaining the affinity for water of the hydrophilic resin itself. Furthermore, if a foaming agent is incorporated, the hydrophilic resin, which is less likely to melt during vulcanization, can be captured and thus the formation of holes inside the composite (fiber) can be promoted.

Examples of the resin having affinity for the rubber component include resins having a solubility parameter (SP value) close to that of the rubber component.

The low melting point resin refers to a resin having a melting point lower than the maximum vulcanization temperature. The maximum vulcanization temperature refers to the maximum temperature reached by the rubber composition during vulcanization. The upper limit of the melting point of the low melting point resin is preferably lower by at least 10° C., more preferably by at least 20° C., than the maximum vulcanization temperature. For example, in the case where the maximum vulcanization temperature is set at 190° C., the melting point of the low melting point resin is usually selected within a range lower than 190° C., preferably within a range of 180° C. or lower, more preferably of 170° C. or lower. The melting point may be, for example, a peak melting temperature as determined using a DSC apparatus.

The low melting point resin may suitably be, for example, a polyolefinic resin. This allows for the formation of holes inside the composite (fiber) while improving the dispersibility of the composite (fiber) of the hydrophilic resin in the rubber component.

The polyolefinic resin may have any of branched, linear, or other structures. The polyolefinic resin may also be an ionomer resin produced by crosslinking of ethylene-methacrylic acid copolymer molecules through a metal ion. Specific examples include polyethylene, polypropylene, polybutene, polystyrene, ethylene-propylene copolymers, ethylene-methacrylic acid copolymers, ethylene-ethyl acrylate copolymers, ethylene-propylene-diene terpolymers, ethylene-vinyl acetate copolymers, and ionomer resins of the foregoing.

The composite (fiber) consisting of a hydrophilic resin provided with a coating layer formed of a low melting point resin can be produced, for example, by blending these resins with a mixing mill, and melt-spinning the blend into undrawn yarns, followed by hot drawing of the undrawn yarns into fibers.

The organic fiber (e.g. the composite) has an average length of usually 0.1 to 500 mm, preferably 0.1 to 7 mm, and an average diameter of usually 0.001 to 2 mm, preferably 0.005 to 0.5 mm. It also has an aspect ratio of usually 10 to 4,000, preferably 50 to 2,000. The aspect ratio refers to the ratio of the major axis to the minor axis of the composite (fiber).

The amount of the organic fiber (e.g. the composite) per 100 parts by mass of the rubber component is preferably 0.1 to 100 parts by mass, more preferably 0.1 to 50 parts by mass. When the amount is within the range indicated above, holes can be formed inside the organic fiber to provide good water drainage while maintaining sufficient durability.

The cap tread rubber composition preferably contains a foaming agent. For example, if the composite is used, a gas generated by the foaming agent during vulcanization can be entered into the hydrophilic resin through the melted coating layer of the low melting point resin so that cells having a shape according to the shape of the composite (fiber), namely elongated cells can be easily formed. As the tire wears, such cells can function as drainage channels to provide water drainage, thereby improving performance on ice and snow.

Examples of the foaming agent include azodicarbonamide (ADCA), dinitrosopentamethylenetetramine (DPT), dinitrosopentastyrenetetramine, benzenesulfonyl hydrazide derivatives, p,p'-oxybis(benzenesulfonyl hydrazide) (OBSH), carbon dioxide-generating ammonium bicarbonate, sodium bicarbonate, ammonium carbonate, nitrogen-generating nitrososulfonylazo compounds, N,N'-dimethyl-N,N'-dinitrosophthalamide, toluenesulfonyl hydrazide, p-toluenesulfonyl semicarbazide, and p,p'-oxybis(benzenesulfonyl semicarbazide). Among these, azodicarbonamide (ADCA), dinitrosopentamethylenetetramine (DPT), and p,p'-oxybis(benzenesulfonyl hydrazide) (OBSH) are preferred, with azodicarbonamide (ADCA) or p,p'-oxybis(benzenesulfonyl hydrazide) (OBSH) being more preferred. The amount of the foaming agent per 100 parts by mass of the rubber component is preferably 0.1 to 20 parts by mass.

A rubber vulcanizate obtained by vulcanizing the rubber composition containing the foaming agent preferably has an expansion ratio of 0.1% to 50%, more preferably 3% to 40%. When the expansion ratio is within the range indicated above, it is possible to ensure the formation of cells which effectively function as drainage channels, while maintaining a moderate amount of cells, thereby avoiding risk of impairing durability. The expansion ratio of the rubber vulcanizate refers to an average expansion ratio (Vs), specifically one calculated from the following equation (I):

$$Vs=(\rho_o/\rho_1-1)\times 100 \, (\%) \quad (I)$$

wherein $\rho_1$ represents the density (g/cm³) of the rubber vulcanizate (foamed rubber), and $p_o$ represents the density (g/cm³) of the solid phase of the rubber vulcanizate (foamed rubber).

In addition to the above materials, the cap tread rubber composition may appropriately contain various materials commonly used in the tire industry, such as antioxidants, surfactants, zinc oxide, stearic acid, waxes, vulcanizing agents, and vulcanization accelerators.

The cap tread rubber composition can be prepared by known methods. For example, it may be prepared by kneading the components in a rubber kneading machine such as an open roll mill or Banbury mixer and vulcanizing the kneaded mixture.

[Base Tread Rubber Composition for Cold Weather Tires]

In the present invention, the cap tread rubber composition for cold weather tires is preferably used in combination with a base tread rubber composition for cold weather tires containing SBR. In this case, the difference in rubber properties between the cap part and the base part of the tread portion is reduced so that the tire can achieve better breaking properties and reduced noise levels.

The ratio of the SBR content in the base tread rubber composition to that in the cap tread rubber composition (mass ratio=base tread/cap tread) is preferably in the range of 100 to 1, more preferably 80 to 1, still more preferably 50 to 2, particularly preferably 40 to 3. When the ratio falls within the range indicated above, the balance of rubber properties between the cap and base treads can be improved. In addition, the migration of fillers or other chemicals in the produced tire can be moderately reduced, and furthermore handling stability during high speed running can be improved.

In the base tread rubber composition, the amount of SBR based on 100% by mass of the rubber component is preferably 20% by mass or more, more preferably 30% by mass or more, still more preferably 40% by mass or more, in order to improve handling stability and processability. The upper limit of the amount is not particularly defined, but is preferably 80% by mass or less, more preferably 70% by mass or less, still more preferably 60% by mass or less, in order to obtain good fuel economy and good low-temperature properties.

To achieve a balanced improvement in fuel economy and handling stability, the base tread rubber composition preferably contains silica in an amount of 0.1 to 10 parts by mass, more preferably 0.3 to 8 parts by mass, still more preferably 0.5 to 5 parts by mass, per 100 parts by mass of the rubber component. Any type of silica may be used. In view of resistance to breaking and other properties, the silica may suitably be one having a nitrogen adsorption specific surface area ($N_2SA$) of 50 m²/g or more, more preferably 100 to 200 m²/g, still more preferably 150 to 200 m²/g.

The base tread rubber composition may appropriately contain various materials as described for the cap tread rubber composition. It may also be prepared as described above.

[Cold Weather Tire]

A cold weather tire including the cap tread rubber composition and the base tread rubber composition can be produced from these rubber compositions by usual methods. Specifically, the unvulcanized cap tread and base tread rubber compositions, which contain various additives as needed, may be extruded and processed into the respective tire component shapes, and then formed and assembled with other tire components on a tire building machine in a usual manner to build an unvulcanized tire, which is then heated and pressurized in a vulcanizer to produce a tire.

According to the present invention, the rubber composition can be used to produce pneumatic tires or non-pneumatic tires. Such cold weather tires can be used as tires for passenger vehicles, trucks and buses, two-wheeled vehicles, or other vehicles, or as high performance tires.

EXAMPLES

The present invention is specifically described with reference to examples, but is not limited thereto.

Polymers and an organic fiber were synthesized as described below in Production Examples 1 to 3. The physical properties were measured as follows.

<Microstructure (Cis Content, Trans Content, Vinyl Content) of Polymer>

The microstructure was analyzed using a BRUKER AV400 NMR spectrometer and data analysis software (TOP SPIN 2.1).

<Weight Average Molecular Weight (Mw)>

The weight average molecular weight (Mw) was determined by gel permeation chromatography (GPC) under the following conditions (1) to (8).

(1) Apparatus: HLC-8220 available from Tosoh Corporation
(2) Separation column: HM-H (two in series) available from Tosoh Corporation
(3) Measurement temperature: 40° C.
(4) Carrier: tetrahydrofuran
(5) Flow rate: 0.6 mL/min
(6) Injection volume: 5 µL
(7) Detector: differential refractometer
(8) Molecular weight standards: polystyrene standards <Measurement of Degree of Epoxidation>

An epoxidized diene rubber was dissolved in deuterated chloroform. The ratio between the number of non-epoxidized diene units and the number of epoxidized diene units in the solution was determined by nuclear magnetic resonance (NMR) spectrometry using a BRUKER AV400 NMR spectrometer and data analysis software (TOP SPIN 2.1), and the degree of epoxidation (unit: % by mass) was calculated using the following equation.

(Degree of epoxidation)=(mass of epoxy in the main chain of rubber)/(mass of diene units (including epoxidized units) in the main chain of rubber)×100

Production Example 1

Modified High Cis BR

An amount of 2.4 kg of cyclohexane and 300 g of 1,3-butadiene were charged into a 5 L autoclave in a nitrogen atmosphere. The autoclave was charged with a catalyst previously prepared by reacting and aging 1,3-butadiene (4.5 mmol) with a solution of neodymium versatate (0.09 mmol) in cyclohexane, a solution of methylaluminoxane (1.0 mmol) in toluene, and a solution of diisobutylaluminium hydride (3.5 mmol) and diethylaluminum chloride (0.18 mmol) in toluene at 50° C. for 30 minutes, followed by performing a polymerization reaction at 80° C. for 70 minutes.

Next, a solution of 3-glycidoxypropyltrimethoxysilane (4.5 mmol) in toluene was added and reacted for 30 minutes to modify the active terminal, with the reaction temperature being maintained at 60° C. Thereto was added a methanol solution containing 1.5 g of 2,4-di-tert-butyl-p-cresol.

Subsequently, the modified polymer solution was added to 20 L of an aqueous solution adjusted to pH 10 with sodium hydroxide, followed by removal of the solvent at 110° C. for two hours and then drying using a roll at 110° C. to obtain BR 1 (modified high cis BR).

The produced polymer had a cis content of 97% by mass, a vinyl content of 1.1%, and a Mw of 480,000.

Production Example 2

Synthesis of Liquid Diene Polymer

A stainless steel polymerization reactor having an internal volume of 2 L and equipped with a stirrer was cleaned and dried, and then purged with dry nitrogen. The reactor was charged with 300 g of cyclohexane and 50 g of 1,3-butadiene, and subsequently with a n-butyllithium/hexane solution containing 5.2 mmol of n-butyllithium (n-BuLi), followed by performing a polymerization reaction for two hours at 50° C. Then, 0.5 mL of a solution of 2,6-di-tert-butyl-p-cresol (BHT) in isopropanol (concentration of BHT: 5% by mass) was added to the polymerization reaction system to stop the polymerization reaction. To the reaction solution were added 100 mL of an aqueous solution containing 5 g of a surfactant and then 100 mL of a peracetic acid solution. The mixture was vigorously stirred under ultrasonic irradiation to perform an epoxidation reaction for 0.5 hours under emulsification conditions. Thereafter, the organic phase was separated and subjected to solvent removal and drying under reduced pressure to obtain a low molecular weight epoxidized BR 1 (L-EBR1).

L-EBR1 was analyzed and found to have a Mw of $1.0 \times 10^4$, a degree of epoxidation of 5% by mass, a vinyl content of 26% by mass, a trans content of 42% by mass, and a cis content of 32% by mass.

Production Example 3

Production of Organic Fiber (Hydrophilic Resin Fiber Provided with Low Melting Point Resin Coating Layer)

An amount of 40 parts by mass of polyethylene (NOVATEC HJ360 (MFR: 5.5, melting point: 132° C.) available from Japan Polyethylene Corporation) and 40 parts by mass of an ethylene-vinyl alcohol copolymer (EVAL F104B (MFR: 4.4, melting point: 183° C.) available from Kuraray Co., Ltd.) were introduced into a twin screw extruder, and they were simultaneously extruded to prepare a hydrophilic resin fiber provided with a coating layer formed of polyethylene in a usual manner. The hydrophilic resin fiber had an average diameter of 20 μm and an average length of 3 mm.

The chemicals used in examples and comparative examples are listed below.

NR: TSR
BR 1: see Production Example 1 (modified high cis BR)
BR 2: BR-150B available from Ube Industries, Ltd.
SBR: Buna SL4525-0 (styrene content: 25% by mass, non-oil extended, unmodified S-SBR) available from Lanxess
Silica 1: Ultrasil 9000GR ($N_2SA$: 240 m$^2$/g, CTAB: 200 m$^2$/g) available from Evonik
Silica 2: Ultrasil VN3 ($N_2SA$: 175 m$^2$/g, CTAB: 175 m$^2$/g) available from Evonik
Silane coupling agent: Si69 available from Evonik
Carbon black 1: DIABLACK A ($N_2SA$: 142 m$^2$/g) available from Mitsubishi Chemical Corporation
Carbon black 2: DIABLACK I (ISAF class, $N_2SA$: 114 m$^2$/g) available from Mitsubishi Chemical Corporation
Liquid plasticizer 1: see Production Example 2 (liquid diene polymer)
Liquid plasticizer 2: NOVARES C10 (liquid coumarone-indene resin) available from Rutgers
Liquid plasticizer 3: Vivatec 500 (TDAE oil) available from H&R
Solid plasticizer 1: terpene resin (YS resin PX300N available from Yasuhara Chemical Co., Ltd., p-pinene resin, softening point: 30° C.)
Solid plasticizer 2: C5/C9 resin (Petrotack 90V available from Tosoh Corporation, softening point: 87° C.)
Stearic acid: stearic acid beads "Tsubaki" available from NOF Corporation
Antioxidant: NOCRAC 6C (N-(1,3-dimethylbutyl)-N-phenyl-p-phenylenediamine) available from Ouchi Shinko Chemical Industrial Co., Ltd.
Zinc oxide: zinc oxide #2 available from Mitsui Mining & Smelting Co., Ltd.
Foaming agent: NEOCELLBORN SB#51 (4,4'-oxybis(benzenesulfonyl hydrazide)) available from Eiwa Chemical Ind. Co., Ltd.
Organic fiber: see Production Example 3
Wax: SUNNOC WAX available from Ouchi Shinko Chemical Industrial Co., Ltd.
Sulfur: powdered sulfur available from Tsurumi Chemical Industry Co., Ltd.
Vulcanization accelerator 1: NOCCELER D (N,N'-diphenylguanidine) available from Ouchi Shinko Chemical Industrial Co., Ltd.
Vulcanization accelerator 2: NOCCELER NS (N-tert-butyl-2-benzothiazolylsulfenamide) available from Ouchi Shinko Chemical Industrial Co., Ltd.

<Preparation of Cap Tread Rubber Composition for Cold Weather Tires>

According to each of the formulations indicated in Tables 1 and 3, the materials listed in the base kneading step section were kneaded in a 1.7 L Banbury mixer (Kobe Steel, Ltd.) at 150° C. for five minutes to give a kneaded mixture. Next, the chemicals listed in the final kneading step section were added to the kneaded mixture, followed by kneading in an open roll mill at 80° C. for five minutes to obtain an unvulcanized rubber composition.

<Preparation of Base Tread Rubber Composition for Cold Weather Tires>

According to the formulation indicated in Table 2, the materials other than the sulfur and vulcanization accelerator were kneaded in a 1.7 L Banbury mixer (Kobe Steel, Ltd.) at 150° C. for five minutes to give a kneaded mixture. Next, the sulfur and vulcanization accelerator were added to the kneaded mixture, followed by kneading in an open roll mill at 80° C. for five minutes to obtain an unvulcanized rubber composition.

<Preparation of Test Tire>

The unvulcanized cap tread rubber composition and the unvulcanized base tread rubber composition were formed into the shape of a cap tread and a base tread, respectively, and then assembled with other tire components on a tire building machine to build an unvulcanized tire. The unvulcanized tire was vulcanized at 170° C. for 10 minutes. to prepare a test tire (size: 205/70R15, cold weather tire for passenger vehicles). The tread pattern of the tire is the same as that of WINTER MAXX02 (tread pattern with fine Sipes for cold weather tires) available from Sumitomo Rubber Industries, Ltd.

[Evaluation]

The test tires were evaluated as described below. Tables 1 and 3 show the results. In Table 1, the results are expressed as an index relative to Comparative Example 1-1 taken as reference. In Table 3, the results of Example 1-1 and Comparative Example 1-5 are expressed as an index relative to Comparative Example 1-1 taken as reference, and the results of Comparative Example 2-1 is expressed as an index relative to Comparative Example 2-2 taken as reference.

<Expansion Ratio Vs>

The expansion ratio of each cap tread formulation was calculated using the aforementioned equation (I).

<Fuel Economy>

The rolling resistance of each test tire was measured using a rolling resistance tester by running the test tire mounted on a 15×6 JJ rim at an internal pressure of 230 kPa, a load of 3.43 kN, and a speed of 80 km/h. The results are expressed as an index, with the reference comparative example set equal to 100. A higher index indicates better fuel economy. Tires with an index of 85 or higher are practically acceptable.

<Abrasion Resistance>

Each set of test tires was mounted on a front-engine, front-wheel-drive car of 2,000 cc displacement made in Japan. After running 8,000 km, the groove depth in the tire tread portion was measured. The distance at which the tire groove depth decreased by 1 mm was calculated and expressed as an index using the equation below. A higher index indicates better abrasion resistance.

(Abrasion resistance index)=(Distance at which groove depth of tire of each example decreased by 1 mm)/(Distance at which groove depth of tire of reference comparative example decreased by 1 mm)×100

<Performance on Ice (Grip Performance on Ice) During High Speed Running>

Vehicle performance on ice was evaluated for each test tire under the following conditions. Each set of test tires was mounted on a front-engine, front-wheel-drive car of 2,000 cc displacement made in Japan. The test was performed on ice at the Asahikawa Tire Proving Ground of Sumitomo Rubber Industries, Ltd. in Hokkaido, Japan. The temperature on ice was −6 to −1° C.

Braking performance (brake stopping distance on ice): The stopping distance on ice was measured, which corresponded to the distance required for the car to stop after the brakes that lock up were applied at 50 km/h. The results are expressed as an index using the equation below, with the reference comparative example set equal to 100. A higher index indicates better braking performance on ice during high speed running.

(Index of grip on ice during high speed running)= (Stopping distance of reference comparative example)/(Stopping distance of each formulation example)×100

<Handling Stability in Cold Weather, High Speed Conditions>

Each set of test tires was mounted on a front-engine, front-wheel-drive car of 2,000 cc displacement made in Japan. A test driver drove the car at 100 km/h on snow- and ice-free roads at 5° C. at the Asahikawa Tire Proving Ground in Hokkaido, Japan. The test driver subjectively evaluated cornering performance and steering linearity. The subjective evaluation was made relative to the reference comparative example given a score of 100, as follows: A score of 120 was given if the test driver judged the performance was obviously improved; a score of 140 was given if a much better level of performance was observed.

<Chipping Resistance>

Each set of test tires was mounted on a front-engine, front-wheel-drive car of 2,000 cc displacement made in Japan. After running about 10,000 km on rough roads, mainly at a quarry and the like, the numbers of cuts and chips per unit area of the tread surface were counted and expressed as an index, with the reference comparative example set equal to 100. A higher index indicates better chipping resistance (breaking properties).

TABLE 1

| Cap tread rubber composition | | | | | | | | | | | | | |
|---|---|---|---|---|---|---|---|---|---|---|---|---|---|
| | | | Example | | | | | | Comparative Example | | | | |
| | | | 1-1 | 1-2 | 1-3 | 1-4 | 1-5 | 1-6 | 1-1 | 1-2 | 1-3 | 1-4 |
| Formulation (parts by mass) | Base kneading step | NR | 43 | 45 | 40 | 34 | 43 | 45 | 50 | 43 | 40 | 43 |
| | | BR 1 (modified high cis BR) | 50 | 50 | 58 | 60 | 50 | 50 | 50 | 50 | 40 | 50 |
| | | SBR (unmodified) | 7 | 5 | 2 | 6 | 7 | 5 | — | 7 | 20 | 7 |
| | | Silica 1 (N$_2$SA: 240) | 160 | 140 | 130 | 140 | 160 | 140 | 130 | 100 | 130 | 130 |
| | | Silane coupling agent (Si69) | 16 | 14 | 13 | 14 | 16 | 14 | 13 | 10 | 10 | 13 |
| | | Carbon black 1 (N$_2$SA: 142) | 5 | 5 | 5 | 5 | 5 | 5 | 5 | 5 | 5 | 5 |
| | | Liquid plasticizer 1 (liquid diene polymer) | 60 | — | — | 20 | 60 | — | 60 | 60 | 60 | 20 |
| | | Liquid plasticizer 2 (liquid coumarone-indene resin) | — | 60 | — | — | — | 60 | — | — | — | — |
| | | Solid plasticizer 1 (terpene resin, softening point: 30° C.) | 20 | 20 | 70 | 40 | — | — | 20 | 20 | — | 20 |
| | | Solid plasticizer 2 (C5/C9 resin, softening point 87° C.) | — | — | — | — | 20 | 20 | — | — | — | — |
| | | Stearic acid | 0.5 | 0.5 | 0.5 | 0.5 | 0.5 | 0.5 | 0.5 | 0.5 | 0.5 | 0.5 |
| | | Vulcanization accelerator 1 | 1.5 | 1.5 | 1 | 1.5 | 1.5 | 1.5 | 1.5 | 1.5 | 1.5 | 1.5 |
| | | Antioxidant | 2 | 2 | 2 | 2 | 2 | 2 | 2 | 2 | 2 | 2 |
| | | Zinc oxide | 1.2 | 1.2 | 1.2 | 1.2 | 1.2 | 1.2 | 1.2 | 1.2 | 1.2 | 1.2 |
| | Final kneading step | Sulfur | 1.8 | 1.5 | 1.5 | 2 | 1.8 | 1.5 | 1.5 | 1.5 | 1.5 | 1.5 |
| | | Foaming agent | — | — | — | 5 | — | — | — | — | — | — |
| | | Organic fiber | — | — | — | 0.5 | — | — | — | — | — | — |
| | | Stearic acid | 1 | 1 | 1 | 1 | 1 | 1 | 1 | 1 | 1 | 1 |

TABLE 1-continued

Cap tread rubber composition

|  |  | Example | | | | | | Comparative Example | | | |
| --- | --- | --- | --- | --- | --- | --- | --- | --- | --- | --- | --- |
|  |  | 1-1 | 1-2 | 1-3 | 1-4 | 1-5 | 1-6 | 1-1 | 1-2 | 1-3 | 1-4 |
|  | Vulcanization accelerator 1 | 0.5 | 0.5 | 0.5 | 0.7 | 0.5 | 0.5 | 0.5 | 0.5 | 0.5 | 0.5 |
|  | Vulcanization accelerator 2 | 1.7 | 1.5 | 1.5 | 1.7 | 1.7 | 1.5 | 1.5 | 1.5 | 1.5 | 1.5 |
|  | Expansion ratio (%) | 0 | 0 | 0 | 18 | 0 | 0 | 0 | 0 | 0 | 0 |
| Evaluation results | Fuel economy | 89 | 92 | 102 | 106 | 91 | 93 | 100 | 113 | 95 | 102 |
|  | Abrasion resistance | 142 | 118 | 110 | 102 | 145 | 122 | 100 | 92 | 97 | 89 |
|  | Performance on ice during high speed running | 131 | 122 | 104 | 146 | 121 | 113 | 100 | 87 | 84 | 80 |
|  | Handling stability in cold weather, high speed conditions | 140 | 130 | 120 | 110 | 143 | 134 | 100 | 90 | 120 | 100 |
|  | Chipping resistance | 153 | 137 | 128 | 97 | 138 | 125 | 100 | 89 | 122 | 77 |

TABLE 2

Base tread rubber composition

|  |  |  | Amount |
| --- | --- | --- | --- |
| Formulation (parts by mass) | Base kneading step | NR | 40 |
|  |  | BR2 (BR150) | 15 |
|  |  | SBR (unmodified) | 45 |
|  |  | Silica 2 (N$_2$SA: 175) | 5 |
|  |  | Carbon black 2 (N$_2$SA: 114) | 40 |
|  |  | Liquid plasticizer 3 (TDAE) | 30 |
|  |  | Wax | 1.5 |
|  |  | Stearic acid | 2 |
|  |  | Antioxidant | 2 |
|  |  | Zinc oxide | 3 |
| | Final kneading step | Sulfur | 2.5 |
| | | Vulcanization accelerator 2 | 2 |

The results in Table 1 demonstrate that, in the examples where a relatively small amount of SBR was added to a specific formulation containing an isoprene-based rubber, BR, silica, and a plasticizer, a highly balanced improvement in fuel economy, abrasion resistance, chipping resistance, performance on ice and snow during high speed running, and high speed performance (handling stability, grip performance) on snow- and ice-free cold roads was achieved; in contrast, in the comparative examples where no SBR was added, where a predetermined amount of silica or a plasticizer was not used, or where a relatively large amount of SBR was added, greatly inferior properties were exhibited.

TABLE 3

Cap tread rubber composition

|  |  |  | Ex. 1-1 | Com. Ex. 1-5 | Com. Ex. 2-1 | Com. Ex. 2-2 |
| --- | --- | --- | --- | --- | --- | --- |
| Formulation (parts by mass) | Base kneading step | NR | 43 | 50 | 68 | 75 |
|  |  | BR 1 (modified high cis BR) | 50 | 50 | 25 | 25 |
|  |  | SBR (unmodified) | 7 | — | 7 | — |
|  |  | Silica 1 (N$_2$SA: 240) | 160 | 160 | 160 | 160 |
|  |  | Silane coupling agent (Si69) | 16 | 16 | 16 | 16 |
|  |  | Carbon black 1 (N$_2$SA: 142) | 5 | 5 | 5 | 5 |
|  |  | Liquid plasticizer 1 (liquid diene polymer) | 60 | 60 | 60 | 60 |
|  |  | Liquid plasticizer 2 (liquid coumarone-indene resin) | — | — | — | — |
|  |  | Solid plasticizer 1 (terpene resin, softening point: 30° C.) | 20 | 20 | 20 | 20 |
|  |  | Solid plasticizer 2 (C5/C9 resin, softening point: 87° C.) | — | — | — | — |
|  |  | Stearic acid | 0.5 | 0.5 | 0.5 | 0.5 |
|  |  | Vulcanization accelerator 1 | 1.5 | 1.5 | 1.5 | 1.5 |
|  |  | Antioxidant | 2 | 2 | 2 | 2 |
|  |  | Zinc oxide | 1.2 | 1.2 | 1.2 | 1.2 |
|  | Final kneading step | Sulfur | 1.8 | 1.8 | 1.8 | 1.8 |
|  |  | Foaming agent | — | — | — | — |
|  |  | Organic fiber | — | — | — | — |
|  |  | Stearic acid | 1 | 1 | 1 | 1 |
|  |  | Vulcanization accelerator 1 | 0.5 | 0.5 | 0.5 | 0.5 |
|  |  | Vulcanization accelerator 2 | 1.7 | 1.7 | 1.7 | 1.7 |
|  |  | Expansion ratio (%) | 0 | 0 | 0 | 0 |

TABLE 3-continued

Cap tread rubber composition

|  |  | Ex. 1-1 | Com. Ex. 1-5 | Com. Ex. 2-1 | Com. Ex. 2-2 |
|---|---|---|---|---|---|
| Evaluation results | Fuel economy | 89 | 89 | 92 | 100 |
|  | Abrasion resistance | 142 | 130 | 98 | 100 |
|  | Performance on ice during high speed running | 131 | 118 | 108 | 100 |
|  | Handling stability in cold weather, high speed conditions | 140 | 120 | 104 | 100 |
|  | Chipping resistance | 153 | 105 | 103 | 100 |

The results in Table 3 show that, in the cases where a small amount of SBR was added to a specific formulation of the present invention containing 50 parts of BR (Example 1-1 vs. Comparative Example 1-5), the balance of fuel economy, abrasion resistance, chipping resistance, performance on ice and snow during high speed running, and high speed performance (handling stability, grip performance) on snow- and ice-free cold roads was significantly improved as compared to the cases where a small amount of SBR was added to a formulation containing 25 parts of BR, which was outside the predetermined range of the present invention (Comparative Example 2-1 vs. Comparative Example 2-2). It is therefore demonstrated that the balance of the properties was synergistically improved by adding a relatively small amount of SBR to the specific formulation of the present invention.

The invention claimed is:

1. A tire, comprising a cap tread formed from a cap tread rubber composition and a base tread formed from a base tread rubber composition,
the cap tread rubber composition comprising:
a rubber component including an isoprene-based rubber, polybutadiene rubber, and styrene-butadiene rubber;
silica; and
a plasticizer,
in the cap tread rubber composition, the isoprene-based rubber and the polybutadiene rubber being present in a combined amount of 80% by mass or more, the polybutadiene rubber being present in an amount of 30% by mass or more, the styrene-butadiene rubber being present in an amount of 0.3% to 10% by mass, each based on 100% by mass of the rubber component,
in the cap tread rubber composition, the rubber composition comprising, per 100 parts by mass of the rubber component, at least 120 parts by mass of the silica and 50 to 150 parts by mass of the plasticizer,
in the cap tread rubber composition, the polybutadiene rubber having a cis content of 70% by mass or more,
the base tread rubber composition comprising a rubber component including the styrene-butadiene rubber,
wherein the mass ratio of the styrene-butadiene rubber content in the base tread rubber composition to the styrene-butadiene rubber content in the cap tread rubber composition (mass ratio=base tread/cap tread) is in the range of 100 to 1.

2. The tire according to claim 1, wherein in the cap tread rubber composition,
the isoprene-based rubber and the polybutadiene rubber are present in a combined amount of 90% by mass or more, and
the styrene-butadiene rubber is present in an amount of 0.3% to 5% by mass, each based on 100% by mass of the rubber component.

3. The tire according to claim 1, wherein the silica has a nitrogen adsorption specific surface area of 180 $m^2/g$ or more.

4. The tire according to claim 1, wherein the plasticizer is at least one of a liquid plasticizer or a solid plasticizer.

5. The tire according to claim 4, wherein the liquid plasticizer is at least one selected from the group consisting of ester plasticizers, terpene resins, C5 resins, C5/C9 resins, styrene resins, coumarone-indene resins, and liquid diene polymers.

6. The tire according to claim 4, wherein the solid plasticizer has a softening point of 25 to 100° C.

7. The tire according to claim 1, the amount of the silica based on 100% by mass of total filler being 60% by mass or more.

8. The tire according to claim 1, wherein in the base tread rubber composition, the amount of the styrene-butadiene rubber based on 100% by mass of the rubber component is 20% to 80% by mass.

9. The tire according to claim 1, wherein the tire is a cold weather tire.

10. A tire, comprising a cap tread formed from a cap tread rubber composition and a base tread formed from a base tread rubber composition,
the cap tread rubber composition comprising:
a rubber component including an isoprene-based rubber, polybutadiene rubber, and styrene-butadiene rubber;
silica; and
a plasticizer,
in the cap tread rubber composition, the isoprene-based rubber and the polybutadiene rubber being present in a combined amount of 80% by mass or more, the polybutadiene rubber being present in an amount of 30% by mass or more, the styrene-butadiene rubber being present in an amount of 0.3% to 10% by mass, each based on 100% by mass of the rubber component,
in the cap tread rubber composition, the rubber composition comprising, per 100 parts by mass of the rubber component, at least 120 parts by mass of the silica and 50 to 150 parts by mass of the plasticizer,
in the cap tread rubber composition, the polybutadiene rubber having a cis content of 70% by mass or more,
the base tread rubber composition comprising a rubber component including the styrene-butadiene rubber,
the base tread rubber composition comprises 0.1 to 10 parts by mass of the silica per 100 parts by mass of the rubber component.

11. The tire according to claim 10, wherein the tire is a cold weather tire.

* * * * *